April 28, 1953　　　　　　　J. B. DAVIS　　　　　　2,636,404
PORTABLE JIG BORING FIXTURE
Filed Nov. 7, 1949　　　　　　　　　　　　　2 SHEETS—SHEET 1
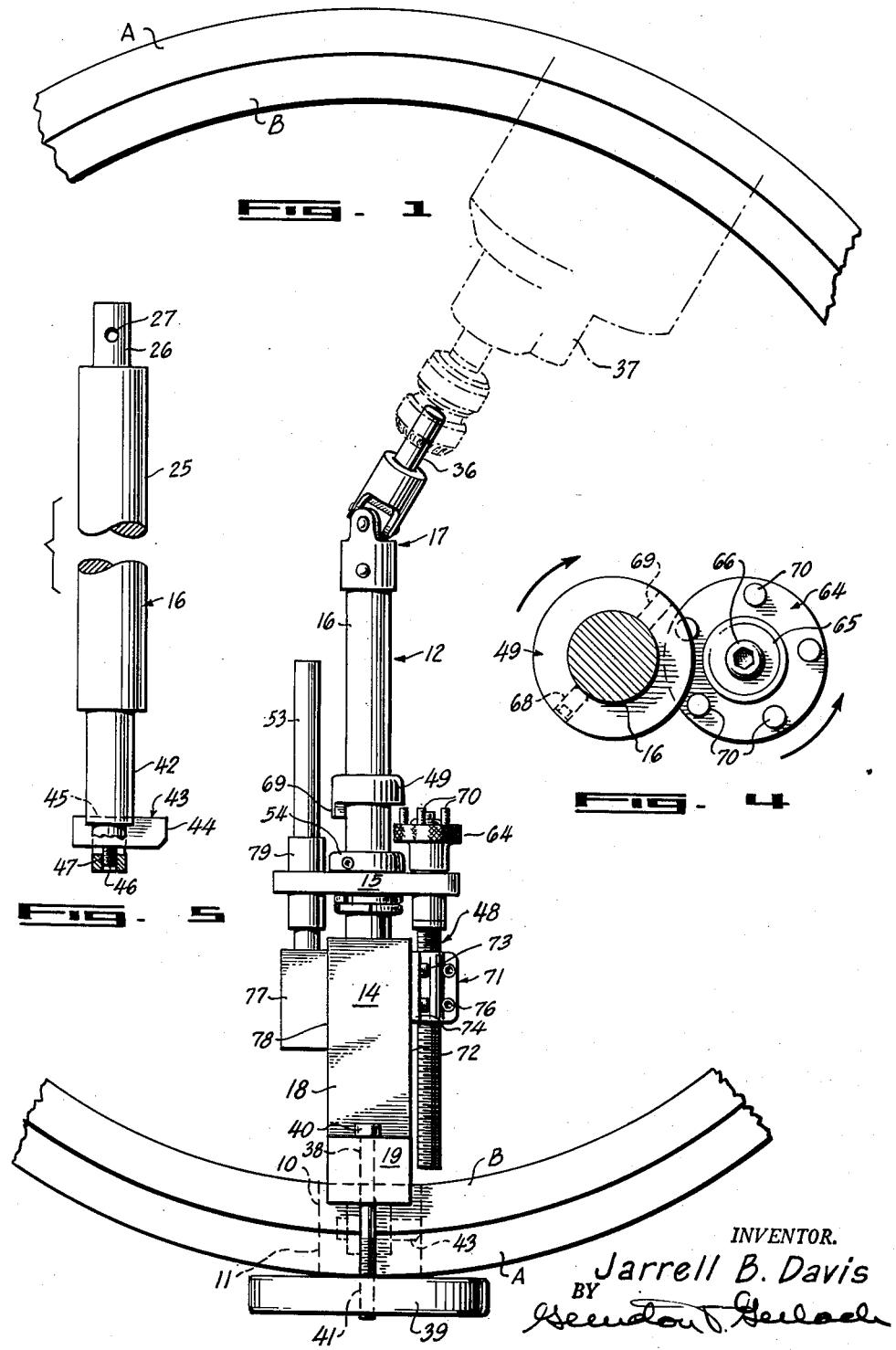
INVENTOR.
Jarrell B. Davis April 28, 1953     J. B. DAVIS     2,636,404
PORTABLE JIG BORING FIXTURE
Filed Nov. 7, 1949     2 SHEETS—SHEET 2
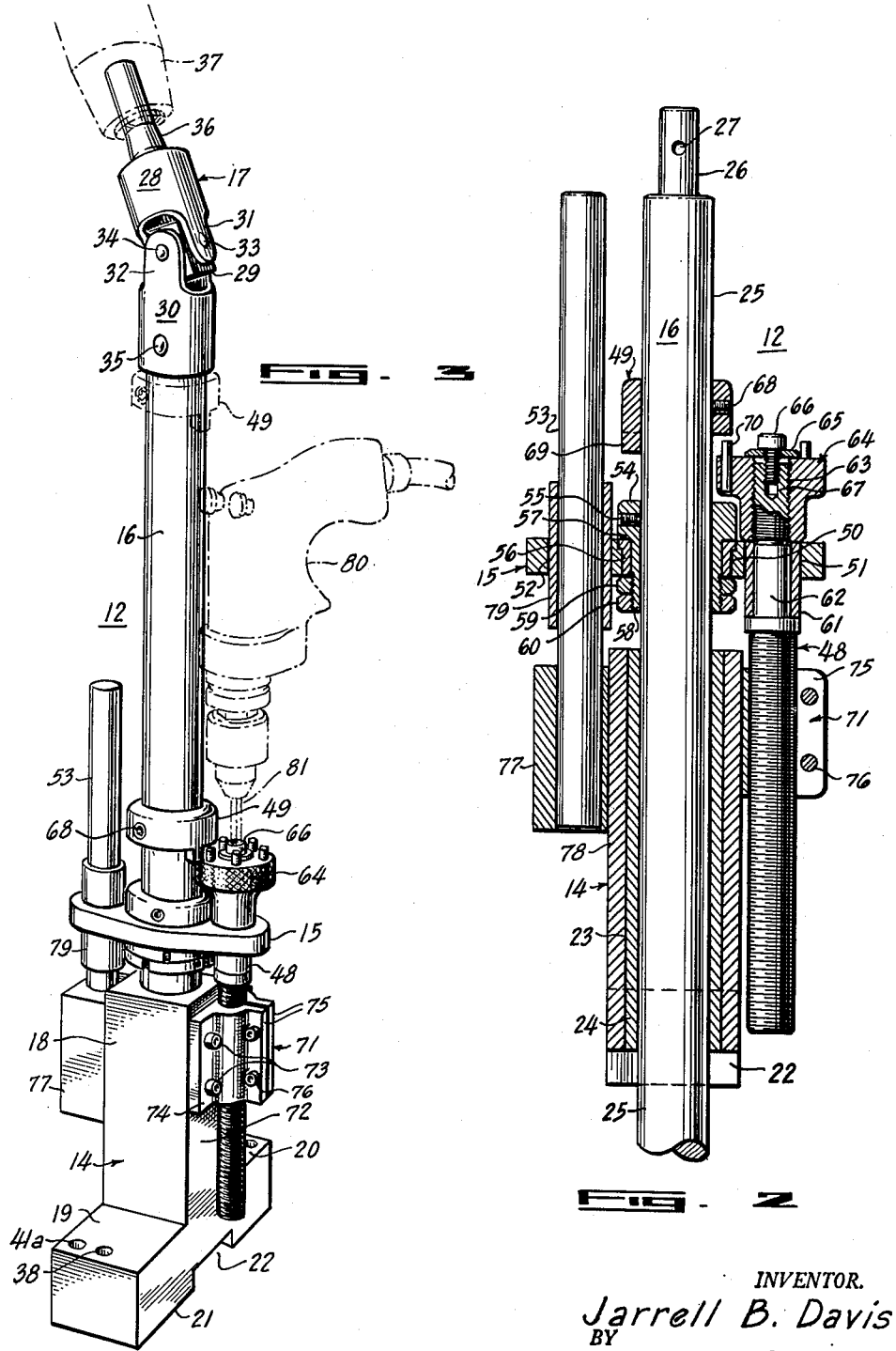
INVENTOR.
Jarrell B. Davis Patented Apr. 28, 1953

2,636,404

UNITED STATES PATENT OFFICE 2,636,404

PORTABLE JIG BORING FIXTURE

Jarrell B. Davis, Fort Worth, Tex., assignor to Consolidated Vultee Aircraft Corporation, San Diego, Calif., a corporation of Delaware Application November 7, 1949, Serial No. 125,895

2 Claims. (Cl. 77—2)

The present invention relates in general to machine tools for precision boring, and is more particularly directed to a portable fixture adapted to be secured to a work-piece and to support, guide, and automatically feed a power-driven boring bar having a cutter disposed within a pre-drilled hole in the work-piece for obtaining a precise and accurately aligned bored hole therein.

Heretofore it has been necessary to accurately locate and rigidly fasten or "set up" a workpiece and its jig on the surface table of large and relatively heavy boring equipment such as a jig boring machine, in order to obtain accurate holes within the tolerances and limits generally required in machined members forming parts of working assemblies. The work and time required to perform these operations is particularly considerable in cases where it is desired to provide bored holes in existing assemblies, since it requires the disassembly of the work and its movement to the boring machine in order to perform the operation, as well as its reassembly when the operation has been completed. It is well appreciated in the art, that the normal "set up" time of such jig boring equipment is in itself an appreciable factor which not only prolongs the time necessary to complete the operation, but also ties up the machine for other uses. Furthermore, there are many applications for boring operations in which the work-piece itself is entirely too large to conveniently or practically "set up" on an available stationary machine. In handling large and cumbersome assemblies in jig boring equipment of the latter type, there is considerable risk of damaging either the work or the stationary machine because of the difficulty of positioning and securing one to the other during the boring operation.

The present jig boring fixture or tool as comprehended by this invention is sufficiently light and portable to permit its support upon the work-piece itself and at the same time to provide equal precision as that obtained in stationary boring machines, thus eliminating the wasteful expenditure of work required for disassembly, set up, and reassembly; and simultaneously reducing the possibility of damage to the work-piece or boring mill, especially in those instances where the work is large in relation to a stationary machine. It is to be noted that conventional boring equipment is relatively expensive, and because the boring of large holes in machine operations is somewhat specialized, there are many machine shops and factories which cannot afford such equipment because of the infrequency of such work. Nevertheless, when an operation of this kind is required it becomes necessary to "job out" the work for this particular operation thus entailing additional cost and risk. The subject invention provides a simple and efficient precision boring fixture of sufficiently low cost to permit its use by even the most modest machine shop or manufacturing operation. At the same time it provides the same, if not greater, flexibility than stationary equipment of considerably higher first cost.

The primary object of the invention is therefore to provide a jig boring fixture or tool that is sufficiently lightweight and compact to permit portability of the tool to the assembly or work-piece for the purpose of performing a boring or reboring operation.

A further object of this invention is to provide a portable jig boring fixture that is capable of being easily aligned and secured or "set up" within close dimensional tolerances and in such a manner that precision bored cutting to very close limits is obtained comparable with results from standard stationary boring machines.

A still further object and advantage of this invention is to provide a light, compact, and portable jig boring fixture that is capable of being secured and aligned with a work-piece and of being universally driven from conventional electric or pneumatic power sources.

Still another object of the invention is to provide a device of the class under consideration that is simple in construction and therefore less expensive in first cost and cost of operation than presently available conventional stationary boring machines.

A still further object of the invention is to provide a portable type jig boring fixture capable of selectively supporting, guiding, and feeding a variety of boring tools from a work-piece in situ for the purpose of precisely locating, aligning, and boring holes within tolerances of plus or minus .00025".

These and other objects and advantages of the present invention will become apparent from the following detailed description and the drawings which form a part hereof, in which like numerals of references denote similar parts throughout the several views.

In the drawing:

Fig. 1 is a front view of the portable jig boring fixture of the invention shown mounted for operation on a typical work piece;

Fig. 2 is a vertical section of the jig boring fixture;

Fig. 3 is a perspective in which a means for quickly adjusting the position of the boring tool with respect to the work is indicated by broken lines;

Fig. 4 is a detail of the indexing mechanism of the tool; and

Fig. 5 is a detail of one form of boring attachment capable of use in connection with the invention.

The form of the invention illustrated in the drawings constitutes a preferred embodiment thereof, and is shown in Fig. 1 as being secured to a typical work-piece A together with a jig B for the purpose of accurately transferring a hole 10 in the latter into the work-piece A. The work-piece A is represented as a rectangular-sectioned circular ring in which it is desired to accurately and precisely form a bored radial hole 11. The general form or size of the work-piece A bears no specific relation to the invention and is described and shown in the present instance merely to emphasize the flexibility and adaptability of the jig boring fixture contemplated in the present invention. The difficulty of performing a boring operation to provide the radial hole 11 in the work-piece A by means of conventional stationary machinery will be apparent, if it is assumed that the diameter of the work piece A is such that it would be impossible to accommodate the boring head of such equipment within the ring-like work-piece A, and difficult or impractical to support the work on the surface plate of such machinery in such a manner that the hole 11 could be bored from the external periphery. The general size and shape of the work-piece, however, is not a limitation to the present invention, and it will be apparent to those skilled in the art that the tool may be utilized in a wide range of work by the provision of relatively simple clamping and hold down means designed to accommodate each particular job.

In reference to Figs. 2 and 3, the portable jig boring fixture 12 consists essentially of a base member 14, a feed plate 15, a boring bar 16, and a universal drive cap 17.

As illustrated, the base member 14 is in the general shape of an inverted T having an elongated square-sectioned body portion 18 with integral transversely-extending projections 19 and 20, the lower faces thereof being accurately ground to provide a lower work-engaging surface 21. The surface 21 is transversely and centrally relieved by a recess 22 of the same cross section as the body 14. The body member 14 is provided with a longitudinal bore 23 accurately disposed at right angles to the plane of the surface 21 and of the recess 22, and which accommodates a journal 24 or sleeve of bronze or other suitable bearing material.

The boring bar 16 comprises an elongated cylindrical body portion 25 terminating at its upper end in a reduced section 26 having a transverse hole 27, and being provided at its lower end with means for securing a variety of cutting tools, one form of which is illustrated in Fig. 5 and which will be described hereafter. The bearing 24 of the base member 14 accommodates the body 25 of the boring bar 16 and is of sufficient length and diameter to rigidly support the boring bar 16 therein for both rotation and longitudinal sliding.

The universal drive cap 17 comprises an upper member 28, a universal block 29, and a lower member 30. The members 28 and 30 are each provided with a pair of axially extending ears 31 and 32 respectively between which the universal block 29 is disposed in assembly, the members 28 and 30 being pivotally supported thereon by pins 33 and 34 disposed at 90° to each other. A universal driving connection is thus formed between the upper member 28 and the lower member 30 so that rotation of one causes rotation of the other over a considerable angular range between their axes. The lower member 30 is axially counterbored to accommodate the reduced section 26 of boring bar 16 and is provided with transverse holes mating with the hole 27 of the boring bar 16 through which a pin 35 is adapted to pass to form a driving connection between the universal drive cap 17 and the boring bar 16.

The upper member 28 of the drive cap 17 is formed with a projecting drive stub 36 of suitable diameter to be secured in the chuck or collet of an electric or pneumatic type hand motor 37.

By means of the universal drive cap 17, rotation of the boring bar 16 in the body member 18 may be accomplished through a wide range of angularity by means of the hand-type motor 37, and in the example illustrated in Fig. 1, it will be seen that this result may be obtained even though the motor 37 cannot be accommodated within the confines of the work-piece A in such a manner that a direct drive to the bar 16 may be obtained. In this instance, although the center line of the boring bar 16 must be disposed within the periphery of the work-piece A, its rotation may be accomplished through the universal drive cap 17 even though the driving motor 37 is disposed to one side or another of the work. The flexibility provided by the universal feature of the drive widens the application of the tool comprehended by the invention and permits its use in a variety of locations where the surrounding structure confines the work area and precludes the use of more cumbersome equipment.

The transversely extending projections 19 and 20 of the base member 14 are provided with centrally disposed holes 38 adjacent their extremities serving as a means for clamping the boring fixture 12 to the work. In the example shown in Fig. 1, this is accomplished by means of a backup plate 39 adapted to be positioned against the external periphery of the work-piece A and to be fastened securely to the base member 14 by means of a pair of bolts 40 passing through the holes 38 and into threaded aligned holes 41 in the plate 39. With the work-piece A and jig B supported in the recess 22 of the tool 12 and with the latter disposed centrally of the hole 10, tensioning of the bolts 40 between the projections 19 and 20 and the back-up plate 39 rigidly secures and aligns the tool 12 in relation to the work-piece A. The use of the back-up plate 39 in the manner shown is a particularly convenient manner of securing the tool 12 in relation to the work-piece A where the dimensions of the work permit access to the underside as a means of support. Many other forms of simple clamping and hold down means may be utilized in connection with the portable jig boring fixture of the present invention depending upon the nature and configuration of the work. Additional holes 41a may be provided in the transverse projections 19 and 20 where it is desirable to pin the tool 12 to the jig or structure surrounding the desired hole in the work-piece A in order to maintain more accurate alignment.

In the example shown in Fig. 1, the accurately prelocated hole 10 in the jig B serves as a guide or transfer hole for the desired hole in the work-piece A. In performing the operation, the hole 11 is pre-drilled through the work-piece A to a diameter less than that of the desired finished hole. The jig B is then assembled with the work-piece A so that the hole 10 is aligned with the drilled hole 11.

The present invention is adapted to a wide variety of cutting operations and to this end, the lower end 42 of the boring bar 16 may be formed in any of a number of arrangements to accommodate cutting tools of various types and sizes. For the purpose of illustration and in connection with the present example, a rectangular-sectioned cutting tool 43 is herein shown, having a sharpened outer cutting edge 44, and being adapted to be secured transversely of the boring bar 16 adjacent its lower end 42 in such a manner that the cutting edge 44 describes a circle of the exact diameter of the desired hole when the boring bar 16 is rotated. The cutting tool 43 is adapted to fit within a transverse slot 45 in the lower end 42 of the boring bar, to be adjusted so that the cutting edge 44 projects the desired amount from the center of the bar 16, and to be secured in position by a screw 46 engaging a suitable threaded hole 47 centrally located in the bottom face of the bar 16 and extending into the slot 45 so that the screw 46 bears against the cutting tool 43 and clamps it in the desired position.

With the jig B positioned together with the work-piece A so that the holes 10 and 11 are in alignment, the boring fixture 12 is then located over the hole 10 in such a manner that rotation of the boring bar 16 is exactly centered therein, and the assembly is then clamped by the bolts 40 and back-up plate 39 to rigidly secure the work-piece A, the jig B, and the boring tool 12 together in accurately aligned and adjusted relation. Rotation of the boring bar 16 by means of the motor 37 and simultaneous axial feed thereof will cause the cutter 43 to bore out the pre-drilled hole 11 to the exact and identical dimension and position of the hole 10 in the jig B.

The portable jig boring fixture 12 of the invention includes means for uniformly feeding the boring bar 16 and its cutting tool 43 toward the work comprising the feed plate 15, a threaded feed spindle 48 and an indexing collar 49. The feed plate 15 is generally a flat member having a central bore 50 and two diametrically opposed holes 51 and 52. The feed spindle 48 is supported by the feed plate and secured for rotation in the hole 51 and a fixed guide shaft 53 is positioned in the hole 52 on the other side of the boring bar 16 to prevent rotation of the feed plate 15 with respect to the boring bar 16 and to provide additional axial support of the latter with respect to the body member 14.

A center collar 54 is adapted to encircle the body 25 of the boring bar 16 and to be adjustably and selectively secured thereto by means of a set screw 55. A bronze sleeve 56 surrounds the collar 54 and abuts against an undercut 57 therein having an external diameter accommodating the hole 50 and forming a bearing therewith. The lower end 58 of the center bushing 54 is externally threaded to accommodate a nut 59 and a lock nut 60. The nut 59 bears against the lower face of the sleeve 56 to secure it against rotation on the center collar 54. The lock nut 60 is adapted to be tightened against the nut 59 to prevent loosening thereof. With the nut 59 clamping the sleeve 56 to the central collar 54, it will be seen that when the latter is secured to the body 25 of the boring bar 16 by the set screw 55, the boring bar 16 may revolve within the feed plate 15 but that the latter will be maintained in its axial or longitudinal position with reference to the boring bar 16.

A depending sleeve 61 is pressed into the hole 51 in the feed plate 15 serving as a journal for a central cylindrical portion 62 of the feed spindle 48. The upper end of the feed spindle 48 is externally threaded at 63 to engage a central threaded bore on a knurled drive cap 64. The drive cap 64 is locked to the upper end of the feed spindle 48 by means of a washer 65 and a locking screw 66 which engages a central threaded hole 67 in the upper end of the feed spindle 48. The outer diameter of the drive cap 64 is such that clearance is provided from the outer surface of the boring bar 16 when the latter is mounted in the jig boring tool 12.

An indexing collar 49 is provided with a central bore for sliding engagement on the body 25 of the boring bar 16 and is adapted to be adjustably secured thereto by means of a set screw 68. The lower surface of the indexing collar 49 is provided with an integral depending lug 69. The upper surface of the drive cap 64 is provided with a number of equally spaced upwardly extending pins 70 which are disposed in the path of the lug 69 as it revolves with the boring tool 16, in such a manner that the drive cap 64 is rotated or indexed upon each revolution of the indexing collar 49 an amount equal to the angular distance between the pins 70.

The lower end of the feed spindle 48 is provided with a fine pitch left-hand external thread and engages a similarly threaded bracket 71 supported on a lateral face 72 of the base 14. The bracket 71 is adapted to be secured to the face 72 by screws 73 passing through flanges 74 into mating tapped holes in the base 14. The bracket 71 is preferably formed of Phosphor bronze or other suitable bearing material, and may be formed with a longitudinal split between a pair of radially extending flanges 75. Cap screws 76 extending through the flanges 75 provide a means of releasing the threaded lower portion of the feed spindle 48 from engagement with the threaded bore of the bracket 71.

The arrangement thus described exemplifies means for automatically and uniformly feeding the boring bar 16 towards the base member 14 as it is rotated, as it will be seen that rotation of the drive cap 64 will move the feed plate 15 toward or away from the base member 14 an amount equal to the pitch of the lower threaded end of the feed spindle 48 for each revolution of the latter, and that if the feed plate 15 is secured to the boring bar 16 by means of the center collar 54 the boring bar 16 will be axially moved relative to the base member 14 in the same manner. Also, when the indexing collar 49 is secured to the body 25 of the boring bar 16 by the set screw 68, so that the lug 69 successively engages the pins 70 of the drive cap 64, rotation of the boring tool 16 will index the feed spindle 48 and feed the boring bar 16 with its cutting tool 43 toward the work.

In order to balance the rotative forces around the boring bar 16 and to provide additional axial support, with respect to the base member 14, a guide shaft 53 disposed on the opposite side of the boring bar 16 from the feed spindle 48 is secured by its lower end to a bracket 77 mounted on a lateral face 78 of the base 14 aligned with and projecting upwardly through a bearing sleeve 79 secured in the hole 52 of the feed collar 15.

The sleeve 79 slidably fits the guide shaft 53, permitting the feed plate 15 to move freely toward and away from the upper end of the base member 14, while resisting its rotation and serving in cooperation with the feed spindle 48 as a balanced outboard support for the boring bar 16 to maintain the latter in precise alignment with the base member 14 and to oppose the radial loads imparted to the tool 12 while the cutting tool 43 is in contact with the work.

By loosening the set screw 55 of the collar 54, and the set screw 68 of the indexing collar 49, the boring bar 16 is released from connection with the feed plate 15 when it is desirable to freely position the boring bar 16 in longitudinal relation with the body member 14, as when setting the cutting tool 43 preparatory to initiating a boring operation. The feed plate 15 is then quickly adjusted to provide sufficient clearance between it and the upper face of the body member 14 by loosening the cap screws 76 to release the threaded bracket 71 from engagement with the lower end of the feed spindle 48. With sufficient clearance between the bottom surface of the feed collar 15 and the body member 14 to enable the cutting tool 43 to pass through the work, the screws 76 are then tightened so that further movement of the two elements towards each other can only be obtained by rotation of the feed spindle 48.

An alternate means of quickly setting the clearance between the feed plate 15 and the body member 14 is indicated in Fig. 3 wherein a reversible electric- or air-operated hand motor 80 is provided with a suitable bit 81 to engage the socket in the head of the screw 66. By this means, the feed spindle may be rapidly run up or down until the desired clearance is obtained between the body portion 14 and the feed plate 15. The plate 15 may then be secured to the boring tool 16 by means of the set-screw 55 with the cutter 43 in its desired axial position with respect to the work, and the indexing collar 49 secured to the boring tool 16 by the set screw 68 in such position that rotation of the tool 16 causes its automatic feeding by reason of the engagement of the lug 69 with the pins 70.

As thus described, the invention comprehends a portable jig boring fixture or tool characterized by light-weight, simplicity and flexibility, and being capable of equal accuracy on boring work in situ as obtainable with conventional, stationary equipment.

While the invention has been described in connection with certain specific structural details, it will be obvious to those skilled in the art that many modifications of these details may be employed without departing from the spirit and scope of the invention as defined in the appended claims.

Having thus described my invention, what I claim as new and desire to secure by Letters Patent is:

1. A portable precision boring fixture including an inverted generally T-shaped base member comprising an elongated body portion having a longitudinal bore therethrough and laterally projecting work engaging portions, means for securing and positioning said base member to a workpiece, an elongated cylindrical boring bar slidably and rotatively movable within said bore of the body portion and projecting beyond opposite ends of the body portion, means at one extremity of said boring bar for supporting a work-engaging tool, feed means for progressively adjusting the longitudinal position of said boring bar with respect to said base member during rotation of said boring bar, said feed means comprising a plate, means rotatively supported on said plate for selectively securing said plate to said boring bar with respect to the longitudinal axis thereof, a threaded spindle rotatively supported by said feed plate and a guide sleeve carried by said feed plate, threaded means supported by said base member at one side of said boring bar having an operative connection with said threaded spindle, a guide shaft carried by said base member at the other side of said boring bar for slidable engagement with said guide sleeve, indexing means adjustably secured to said boring bar and rotatable therewith and means on said indexing means for moving said threaded spindle longitudinally with respect to said base member during rotation of said boring bar.

2. A portable precision boring fixture including an inverted generally T-shaped base member comprising an elongated body portion having a longitudinal bore therethrough and laterally projecting work engaging portions, means for securing and positioning said base member to a workpiece, an elongated cylindrical boring bar slidably and rotatively journaled within said bore of the body portion and projecting beyond opposite ends of the body portion, means at one extremity of said boring bar for supporting a work-engaging tool, feed means for progressively adjusting the longitudinal position of said boring bar with respect to said base member, said feed means comprising a plate, collar means rotatively supported on said plate for selectively securing said plate to said boring bar with respect to the longitudinal axis thereof, a threaded spindle rotatively supported by said feed plate, a plurality of equally spaced projecting members supported at an end of said threaded spindle and a guide sleeve carried by said feed plate, threaded means supported by said base member at one side of said boring bar having an operative connection with said threaded spindle, a guide shaft rigidly secured to said base member at the other side of said boring bar for slidable engagement with said guide sleeve, and indexing means comprising a collar adjustably secured to said boring bar and rotatable therewith, said collar having a depending portion engageable with said projecting members carried by said threaded spindle for moving said threaded spindle longitudinally with respect to said base member during rotation of said boring bar.

JARRELL B. DAVIS.

References Cited in the file of this patent

UNITED STATES PATENTS

| Number | Name | Date |
|---|---|---|
| 760,525 | Crossman | May 24, 1904 |
| 796,731 | Kardatzke et al. | Aug. 8, 1905 |
| 1,814,920 | Hartwell | July 14, 1931 |
| 1,844,316 | Fryckberg | Feb. 9, 1932 |
| 1,899,128 | Anderson | Feb. 28, 1933 |
| 2,065,486 | Albertson | Dec. 22, 1936 |

FOREIGN PATENTS

| Number | Country | Date |
|---|---|---|
| 125,447 | Germany | Feb. 20, 1900 |
| 484,125 | Great Britain | May 2, 1938 |